United States Patent
Krimmer et al.

(10) Patent No.: US 6,659,427 B2
(45) Date of Patent: Dec. 9, 2003

(54) FLAP VALVE

(75) Inventors: Erwin Krimmer, Pluederhausen (DE); Ralph Krause, Waiblingen (DE); Peter Baur, Waiblingen (DE); Christian Lorenz, Aalen-Unterrombach (DE); Klaus Kaiser, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/220,425

(22) PCT Filed: Dec. 8, 2001

(86) PCT No.: PCT/DE01/04631

§ 371 (c)(1),
(2), (4) Date: Dec. 9, 2002

(87) PCT Pub. No.: WO02/053895

PCT Pub. Date: Jul. 11, 2002

(65) Prior Publication Data

US 2003/0146403 A1 Aug. 7, 2003

(30) Foreign Application Priority Data

Jan. 3, 2001 (DE) .......................... 101 00 158

(51) Int. Cl.[7] .............................. F16K 1/22; F02D 9/10
(52) U.S. Cl. ........................................ 251/306; 123/337
(58) Field of Search ................................. 251/304–308; 123/337

(56) References Cited

U.S. PATENT DOCUMENTS

| 4,513,946 A | * | 4/1985 | Priese | 251/306 |
| 5,236,003 A | * | 8/1993 | Habicht | 251/306 |
| 5,531,205 A | * | 7/1996 | Cook et al. | 251/306 |
| 5,881,995 A | * | 3/1999 | Tse et al. | 251/305 |
| 5,979,871 A | * | 11/1999 | Forbes et al. | 251/305 |
| 6,047,951 A | * | 4/2000 | Ito et al. | 251/308 |

* cited by examiner

Primary Examiner—Paul J. Hirsch
(74) Attorney, Agent, or Firm—Ronald E. Greigg

(57) ABSTRACT

In a flap valve for controlling a gas flow, with a valve tube (11) that carries the gas flow and with a valve flap (14) that is pivotable in the valve tube (11) and that in its closing position rests sealingly with its outer contour on the inner wall of a flexible thin-walled tube (20) disposed coaxially in the valve tube (11), and with a valve shaft (15) connected to the valve flap (14) in a manner fixed against relative rotation, it is provided, in order to attain a sensitive adjustment of the valve flap (14) and for the sake of technologically simple, inexpensive production of the flap valve (14), that the valve shaft (15) is positioned at an acute angle (γ) relative to the valve plane, and the thin-walled tube (20) is formed directly and integrally onto the valve tube (11) (FIG. 2).

20 Claims, 2 Drawing Sheets

FLAP VALVE

CROSS-REFERENCE TO RELATED APPLICATIONS

This application is a 35 USC 371 application of PCT/DE 01/04631, filed on Dec. 8, 2001.

BACKGROUND OF THE INVENTION

1. Field of the Invention

The invention is directed to an improved flap valve for controlling a gas flow in a gas flow system of an internal combustion engine.

2. Description of the Prior Art

In a known disposition of a throttle valve in an exhaust system of an internal combustion engine (German Patent Disclosure DE 43 05 123 A1), the valve shaft, which carries the throttle valve and extends parallel to the valve plane, is guided on both sides by a bearing bore in the conduit wall of the exhaust system and protrudes through one bearing sleeve on each side. To achieve greater tightness while avoiding sluggishness of the valve actuation, the bearing sleeves, axially prestressed by spring force each in a respective bearing housing, are radially displaceable within the bearing housings, thus automatically compensating for dimensional differences between stop faces, formed on the conduit wall, for the throttle valve and the valve shaft bearing upon first closure of the throttle valve.

In German Patent Disclosure DE 199 34 113.3, which had not yet been published by the priority date of the present application, it has already been proposed that a flap valve of the type defined at the outset be used as an exhaust gas recirculation valve for the metered admixture of exhaust gas with the aspirated fresh air in the intake system of an internal combustion engine. In this case, an opening into which the flap valve is inserted with its valve outlet in gastight fashion, is provided in the jacket of an intake tube of the intake system. The valve flap, with a valve shaft positioned obliquely to the valve plane, is disposed in a thin-walled tube for the sake of flap adjustment; the thin-walled tube rests with radial play in the rigid valve tube and is secured by one tubular portion to the valve tube. By suitable shaping of the valve flap, the valve flap in its closing position conforms to the inner wall of the elastic thin-walled tube and closes off the tube cross section in gastight fashion, so that a separate seal between the valve tube and the valve flap can be dispensed with.

SUMMARY OF THE INVENTION

The flap valve of the invention has the advantage that the valve tube and the thin-walled tube can be produced economically, especially if, in accordance with an advantageous embodiment of the invention, they are injection-molded of plastic. With injection molding technology, it is unproblematic to vary the wall thickness and the tube length of the integrally formed-on thin-walled tube and thus to adapt the elasticity, required for the tightness of the flap valve, of the thin-walled tube to the thin-walled tube diameter. The elastic thin-walled tube, in the closing state of the valve flap, conforms tightly to the valve flap, so that stringent demands for tightness, of the kind made for control valves for internal combustion engines, especially in a throttle valve for an aspirating engine, can be met quite well without entailing major production cost and without making stringent demands in terms of the precision of production.

Because of the oblique position of the valve shaft to the plane of the valve flap solidly connected to it, on the one hand the required leadthroughs in the valve shaft in the valve tube are located outside the thin-walled tube, so that critical sealing problems do not arise in the closing region, and on the other, greater sensitivity in the adjustment of the flap valve is achieved, since the requisite rotary angle range of the valve shaft between the closing position and the maximally open position of the valve flap increases, in fact to an increasing extent as the positioning angle becomes greater.

In one advantageous embodiment of the invention, a connection collar is embodied on one end of the valve tube, which collar surrounds the thin-walled tube with radial spacing and protrudes axially past the free end of the thin-walled tube. As a result of this structural provision, on the one hand simple integration of the elastic thin-walled tube into the valve tube is possible, and on the other, easy unmolding of the valve tube in the injection molding process is assured. Preferably the inside diameters of the valve tube and the thin-walled tube are equal, while the connection collar has an inside diameter greater than the outside diameter of the thin-walled tube.

In a preferred embodiment of the invention, the flap valve serves to control the air aspirated in the intake system of an internal combustion engine; the valve flap forms the throttle valve, which is actuated by a rotary drive mechanism, and the valve tube, in the form of a so-called throttle valve neck, is integrated into the throttle valve housing. By the positioning of the axis of the valve shaft relative to the plane of the valve or the throttle valve, sealing problems that occur in conventional throttle valve controllers because of the leadthrough of the valve shaft in the throttle valve neck, are eliminated; this is because in the flap valve of the invention, because of the oblique position of the valve shaft, the valve shaft indeed penetrates the valve tube or throttle valve neck, but does not penetrate the thin-walled tube that assures the tightness of the flap valve. The leadthrough in the valve tube and in the throttle valve neck can be sealed off without problems. Moreover, because of the angular position of the valve shaft to the plane of the throttle valve, small-quantity metering near the closing range of the throttle valve is improved substantially, so that during engine idling, for the same gear ratio of the rotary drive mechanism, especially sensitive controllability of the throttle valve and thus of the aspirated air quantity is achieved.

BRIEF DESCRIPTION OF THE DRAWINGS

The invention is explained in further detail herein below, with specific reference to the drawings, in which.

DESCRIPTION OF THE PREFERRED EMBODIMENTS

Figure 1:
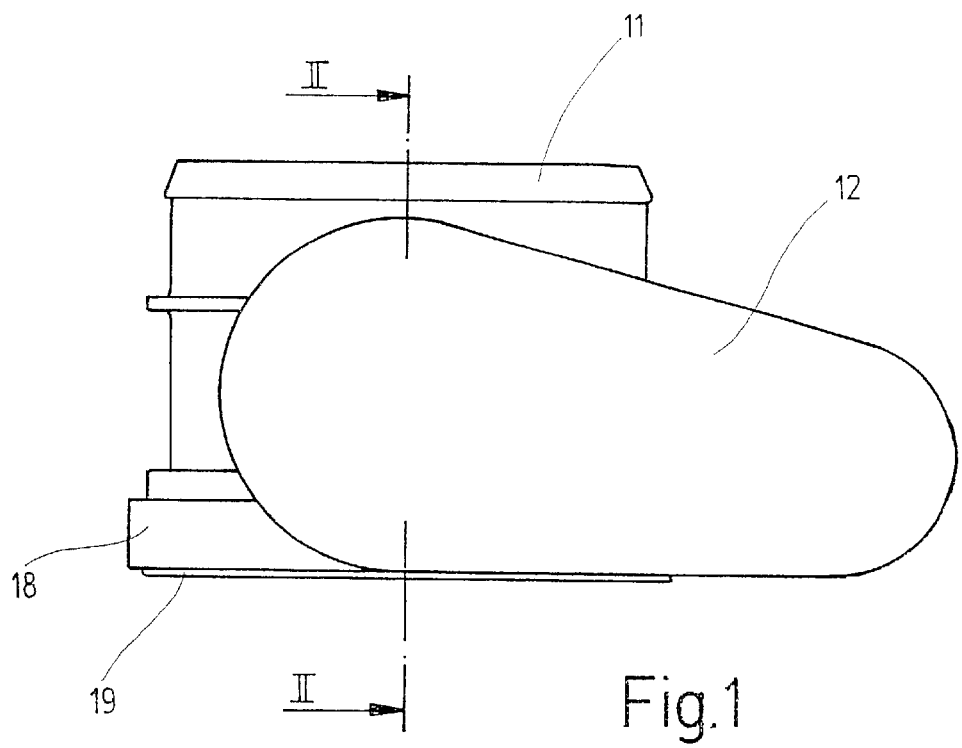
FIG. 1 is a side view of a throttle valve control unit for the internal combustion engine.
Figure 2:
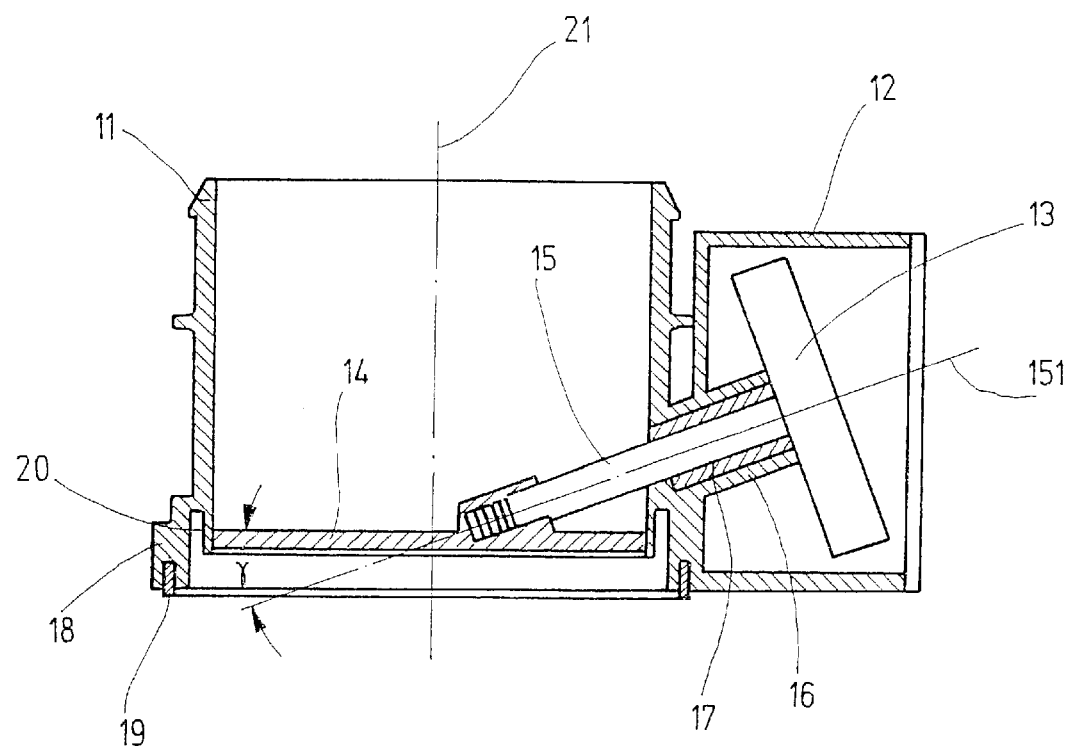
FIG. 2 is a section taken along the line II—II in FIG. 1.

The throttle valve control unit, shown in a side view in FIG. 1 and in section in FIG. 2, serves, as a special exemplary embodiment, for a general flap valve for controlling the air supplied to an internal combustion engine. It has a valve tube 11, known as a throttle valve neck, which is inserted into an intake line of the intake system of the engine, and a drive housing 12, which is connected to the valve tube 11 and in which a rotary drive mechanism 13 is disposed, for adjusting a valve flap or throttle valve 14 disposed in the valve tube 11. The throttle valve 14 is connected in a manner fixed against relative rotation to a valve shaft 15, and the valve shaft 15 is positioned at an acute angle to the valve plane of flap face; that is, the axis 151 of the valve shaft 15 forms the acute angle γ (FIG. 2) with the valve plane. The valve shaft 15 is rotatably supported by a slide bearing 17 through a leadthrough 16 that pierces the wall of the valve tube 11 and of the drive housing 12. The rotary drive mechanism 13 engages the free end of the valve shaft 15 and can be embodied, for example, as an electric motor with a step-up gear. As FIG. 2 shows, the rigid valve tube 11 is provided on its tube end with a connection collar 18, which is shifted radially outward and which receives a sealing ring 19, in an annular groove made on the face end. The connection collar 18 is embodied integrally with the valve tube 11.

In the region of the transition between the valve tube 11 and the connection collar 18, a short, flexible thin-walled tube 20 is formed integrally with and extends axially from the valve tube 11. This thin-walled tube 20 has the same inside diameter as the valve tube 11, and it is surrounded with radial spacing by the connection collar 18, which has an inside diameter greater than the outside diameter of the thin-walled tube 20; the connection collar 18 also protrudes axially past the free end of the thin-walled tube 20. The wall thickness and axial length of the thin-walled tube 20 are adapted to the tube diameter of the thin-walled tube 20 such that the thin-walled tube 20 has sufficient elasticity to be capable of being deformed, within limits, by the throttle valve 14. The valve tube 11 with the thin-walled tube 20 is preferably made from plastic by injection molding. It can equally possibly be produced from metal.

The circular throttle valve 14 has an outside diameter which is equal to the inside diameter of the thin-walled tube 20. The outside diameter of the throttle valve 14 preferably has a slight oversize compared to the inside diameter of the thin-walled tube 20. In the closing position, shown in FIG. 2, of the throttle valve 14, the elastic thin-walled tube 20 with its inner wall thus conforms in completely gastight fashion to the outer contour of the circular throttle valve 14. In the closing position of the throttle valve 14, the surface normal of the throttle valve 14 is aligned with the axis 21 of the valve tube 11 and the thin-walled tube 20, or, depending on the magnitude of the oversize of the throttle valve 14, it forms a small acute angle with the axis 21.

Figure 3:
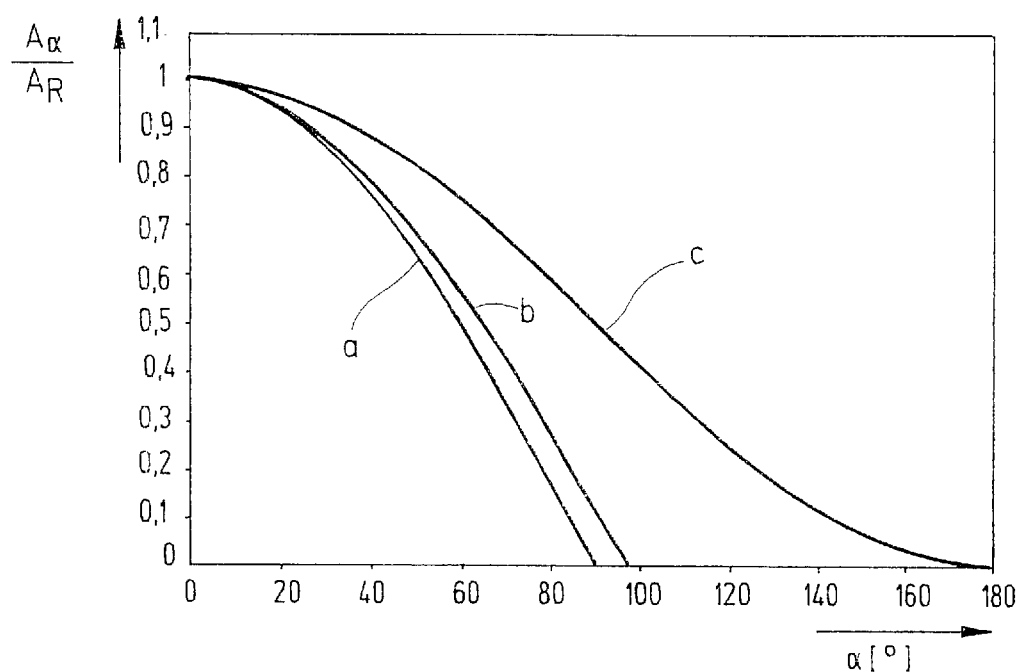
FIG. 3, a graph showing the relative surface-area coverage of a tube cross section, controlled by the throttle valve, as a function of the rotary angle thereof.

Because of the angular positioning of the valve shaft 15 relative to the throttle valve 14, the small-quantity meterability of the throttle valve control unit, in the range of a nearly-closed throttle valve 14, is improved, so that in the idling range of the engine, a very sensitive controllability of the throttle valve control unit is achieved. For clarification, FIG. 3 shows the relative area coverage of the throttle valve 14, as a function of its angle of rotation α. The relative area coverage is the result of the ratio of the flap face $A_\alpha$, projected onto the tube cross section, to the tube cross section, or to the inside tube area $A_R$ of the thin-walled tube 20. This relative area coverage is dependent on the positioning angle γ of the valve shaft 15 relative to the throttle valve 14; for the curve a, this angle is 0°, for the curve b it is 20°, and for the curve c it is 45°. It can be seen clearly that in the immediate vicinity of the closing range ($A_\alpha/A_R=1$) of the throttle valve 14 for the curve c, larger rotary angles a at the throttle valve 14 must be established, in order to obtain the same opening of the tube cross section as for the curve a. The curve a represents a conventional connection of the valve shaft 15 and throttle valve 14, at which the valve shaft 15 is oriented parallel to the flap face.

The foregoing relates to preferred exemplary embodiments of the invention, it being understood that other variants and embodiments are possible within the spirit and scope of the invention, the latter being defined by the appended claims.

We claim:

1. A flap valve for controlling a gas flow, comprising
a valve tube (11) carrying the gas flow,
a valve flap (14) disposed in the valve tube (11) and being pivotable between a closing and opening position, the valve flap being seated in a manner fixed against relative rotation on a rotatable valve shaft (15) and being dimensioned to cover an inside cross section of the valve tube (1) in its closing position and to maximally open this inside cross section in the opening position of the valve tube,
the valve shaft (15) being positioned at an acute angle (γ) relative to the valve plane, and
a thin-walled tube (20), integrally formed with the valve tube (11) and elastically surrounding the valve flap (14) peripherally in its closing position.

2. The flap valve of claim 1 further comprising a connection collar (18) embodied on one end of the valve tube (11), which collar surrounds the thin-walled tube (20) with radial spacing and protrudes axially past the free end of the thin-walled tube (20).

3. The flap valve of claim 2 wherein the inside diameters of the valve tube (11) and the thin-walled tube (20) are of equal size, and wherein the connection collar (18) has an inside diameter that is greater than the outside diameter of the thin-walled tube.

4. The flap valve of claim 1 wherein the wall thickness and the axial length of the thin-walled tube (20) are adapted to the tube diameter such that the thin-walled tube (20) has an elasticity that is adequate for a slight deformability by the valve flap.

5. The flap valve of claim 2 wherein the wall thickness and the axial length of the thin-walled tube (20) are adapted to the tube diameter such that the thin-walled tube (20) has an elasticity that is adequate for a slight deformability by the valve flap.

6. The flap valve of claim 3 wherein the wall thickness and the axial length of the thin-walled tube (20) are adapted to the tube diameter such that the thin-walled tube (20) has an elasticity that is adequate for a slight deformability by the valve flap.

7. The flap valve of claim 1 wherein the valve tube (11) and the thin-walled tube (20) are made of plastic.

8. The flap valve of claim 3 wherein the valve tube (11) and the thin-walled tube (20) are made of plastic.

9. The flap valve of claim 4 wherein the valve tube (11) and the thin-walled tube (20) are made of plastic.

10. The flap valve of claim 1 wherein, the thin-walled tube (20) has a circular inside cross section, and the circular valve flap (14) has an outside diameter that compared to the inside diameter of the thin-walled tube (20) is equal to or is slightly greater with a slight oversize.

11. The flap valve of claim 3 wherein the thin-walled tube (20) has a circular inside cross section, and the circular valve flap (14) has an outside diameter that compared to the inside diameter of the thin-walled tube (20) is equal to or is slightly greater with a slight oversize.

12. The flap valve of claim 4 wherein the thin-walled tube (20) has a circular inside cross section, and the circular valve flap (14) has an outside diameter that compared to the inside diameter of the thin-walled tube (20) is equal to or is slightly greater with a slight oversize.

13. The flap valve of claim 7 wherein, the thin-walled tube (20) has a circular inside cross section, and the circular valve flap (14) has an outside diameter that compared to the inside diameter of the thin-walled tube (20) is equal to or is slightly greater with a slight oversize.

14. The flap valve of claim 10 wherein the valve flap (14) is disposed in the valve tube (11) such that in its closing position, the surface normal of the valve flap (14) is in alignment with the tube axis (21) of the thin-walled tube (20), or forms a very small acute angle with this axis.

15. The flap valve of claim 3 wherein the valve flap (14) is disposed in the valve tube (11) such that in its closing position, the surface normal of the valve flap (14) is in alignment with the tube axis (21) of the thin-walled tube (20), or forms a very small acute angle with this axis.

16. The flap valve of claim 7 wherein the valve flap (14) is disposed in the valve tube (11) such that in its closing position, the surface normal of the valve flap (14) is in alignment with the tube axis (21) of the thin-walled tube (20), or forms a very small acute angle with this axis.

17. The flap valve of claim 1 the valve shaft (15) is supported rotatably in the valve tube (11).

18. The flap valve of claim 14 the valve shaft (15) is supported rotatably in the valve tube (11).

19. The flap valve of claim 14 the valve shaft (15) is supported rotatably in the valve tube (11).

20. In an air supply system for controlling the air supplied to an internal combustion engine, comprising a flap valve according to claim 1 wherein the valve tube (11) with the integrated thin-walled tube (20) forms a throttle valve neck adapted for insertion into an intake system of the internal combustion engine, and wherein the valve flap forms a throttle valve (14).

* * * * *